United States Patent [19]
Takahashi et al.

[11] Patent Number: 5,487,000
[45] Date of Patent: Jan. 23, 1996

[54] SYNTACTIC ANALYSIS APPARATUS

[75] Inventors: Masanori Takahashi, Yokohama; Tadashi Nagano, Kodaira; Hideko Mori, Kawasaki; Masaki Kiyono, Ashiya, all of Japan

[73] Assignee: Mitsubishi Electric Industrial Co., Ltd., Osaka, Japan

[21] Appl. No.: 197,995

[22] Filed: Feb. 17, 1994

[30] Foreign Application Priority Data

Feb. 18, 1993 [JP] Japan ................................ 5-029361

[51] Int. Cl.$^6$ .................................................... G06F 17/27
[52] U.S. Cl. ................................. 364/419.08; 364/419.14; 364/419.17
[58] Field of Search .................... 364/419.01, 419.02, 364/419.08, 419.04, 419.05, 419.06, 419.07, 419.14, 419.17; 395/375, 600, 650, 700

[56] References Cited

U.S. PATENT DOCUMENTS

| | | | |
|---|---|---|---|
| 4,617,643 | 10/1986 | Klock et al. | 395/700 |
| 4,821,230 | 4/1989 | Kumano et al. | 364/419.06 |
| 4,833,611 | 5/1989 | Fukumochi et al. | 364/419.05 |
| 4,989,145 | 1/1991 | Kyoshima | 364/419.08 |
| 5,109,509 | 4/1992 | Katayama et al. | 395/600 |
| 5,146,406 | 9/1992 | Jensen | 364/419.08 |
| 5,259,766 | 11/1993 | Sack et al. | 434/362 |
| 5,299,124 | 3/1994 | Fukumochi et al. | 364/419.02 |

*Primary Examiner*—Gail O. Hayes
*Assistant Examiner*—Joseph Thomas
*Attorney, Agent, or Firm*—Lowe, Price, LeBlanc & Becker

[57] ABSTRACT

In a syntactic analysis apparatus, when a syntax analyzing section fails in a syntactic analysis of an input sentence due to a syntactic error included in the input sentence and thus is unable to generate a syntactic tree of the input sentence, an error analyzing section receives syntactic subtrees of the input sentence obtained by the syntax analyzing section up to such failure and applies a given error analyzing rule to the received syntactic subtrees so as to identify the included syntactic error. The input sentence is corrected based on the identification of the syntactic error so as to be sent to the syntax analyzing section. The syntax analyzing section performs the syntactic analysis of the corrected input sentence and generates a syntactic tree of the corrected input sentence.

14 Claims, 4 Drawing Sheets

FIG. 3

(PHRASE STRUCTURE CONDITIONING SECTION)
⟨NP⟩ ⟨VP⟩ ⟨ . ⟩

(ATTRIBUTE CONDITIONING SECTION)
Condition-1
Condition-2
Condition-3
- - - - - - - - -

(EXECUTING SECTION)
ApplyFunc-1
ApplyFunc-2
ApplyFunc-3
- - - - - - - - -

FIG. 4(A) "He drink water."

FIG. 4(B)
⟨NP⟩ ⟨NH⟩ ⟨N⟩ "He"
⟨VP⟩ ⟨VP⟩ ⟨V⟩ "drink"
    ⟨NP⟩ ⟨NH⟩ ⟨N⟩ "water"

FIG. 5(A) "He drinks water."

FIG. 5(B)
⟨S⟩ ⟨NP⟩ ⟨NH⟩ ⟨N⟩ "He"
    ⟨VP⟩ ⟨VP⟩ ⟨V⟩ "drinks"
        ⟨NP⟩ ⟨NH⟩ ⟨N⟩ "water"

SYNTACTIC ANALYSIS APPARATUS

BACKGROUND OF THE INVENTION

1. Field of the Invention

The present invention relates to a syntactic analysis apparatus which performs a syntactic analysis of an input sentence so as to produce a syntactic tree of the input sentence, and more specifically, to the syntactic analysis apparatus which is particularly effective for producing the syntactic tree when the input sentence includes a syntactic error.

2. Description of the Prior Art

In a conventional syntactic analysis apparatus, when an input sentence includes a syntactic error, a result is, for example, failing in a syntactic analysis of the input sentence due to failure in applying a syntax analyzing rule, or outputting syntactic subtrees of the input sentence obtained up to the failure in the syntactic analysis of the input sentence, or dividing the input sentence into units each syntactically analyzable so as to reanalyze the syntax of the input sentence. However, any of these results does not accomplish a final object of the syntactic analysis apparatus, that is, generating a correct syntactic tree of the entire input sentence.

On the other hand, there have also been available another syntax analyzing method, wherein a syntactic analysis of an input sentence is performed such that a simple error in a syntactic attribute relationship is allowed by removing an attribute check function from a syntax analyzing rule.

In general, the syntactic analysis checks appropriateness with respect to a combination of parts of speech or other grammatical categories of a portion of the input sentence and with respect to an attribute relationship therebetween, and produces a syntactic subtree corresponding to a syntax analyzing rule which is determined applicable based on the above-noted appropriateness, so as to finally generate a syntactic tree of the entire input sentence. Accordingly, as appreciated, when there are plural combinations of the syntax analyzing rules which are determined applicable, a plurality of the syntactic trees are produced for one input sentence.

Accordingly, when a condition on the appropriateness relative to the attribute relationship is relaxed in the syntax analyzing rule as in the foregoing prior art, a syntax analyzing rule which should not be actually applied is likely to be determined applicable. As a result, a number of the syntactic trees including wrong syntactic trees are generated relative to one input sentence.

SUMMARY OF THE INVENTION

Therefore, it is an object of the present invention to provide an improved syntactic analysis apparatus.

According to one aspect of the present invention, a syntactic analysis apparatus for performing a syntactic analysis of an input sentence according to a given syntax analyzing rule so as to output a syntactic tree of the input sentence, comprises syntax analyzing means for outputting syntactic subtrees of the input sentence created by the syntax analyzing means up to a time point when the syntax analyzing means fails in the syntactic analysis of the input sentence due to a syntactic error included in the input sentence; and error analyzing means for receiving the syntactic subtrees from the syntax analyzing means and for identifying the syntactic error by applying a given error analyzing rule to the received syntactic subtrees.

According to another aspect of the present invention, the syntactic analysis apparatus further includes input sentence correcting means for correcting the input sentence based on the identified syntactic error.

According to another aspect of the present invention, the syntactic analysis apparatus further includes error analyzing rule generating means for generating the error analyzing rule by logically inverting the syntax analyzing rule.

According to another aspect of the present invention, a syntactic analysis apparatus comprises first means for receiving an input sentence and for performing a syntactic analysis of the input sentence based on a given syntax analyzing rule, the first means outputting a syntactic tree of the input sentence when the syntactic analysis is succeeded and outputting syntactic subtrees of the input sentence when the syntactic analysis ends in failure due to a syntactic error included in the input sentence; and second means for receiving the syntactic subtrees of the input sentence and for identifying the syntactic error by applying a given error analyzing rule to the received syntactic subtrees.

According to another aspect of the present invention, the error analyzing rule includes a first condition defining an attribute relationship between given grammatical categories, the first condition being logically inverted relative to a corresponding second condition in the syntax analyzing rule so as to enable the second means to identify the syntactic error when the first condition matches the received syntactic subtrees.

According to another aspect of the present invention, the syntactic analysis apparatus further includes means for automatically producing the error analyzing rule from the syntax analyzing rule by logically inverting the corresponding second condition in the syntax analyzing rule.

According to another aspect of the present invention, the error analyzing rule further includes a correction command corresponding to the first condition, the correction command defining a location and a kind of the syntactic error.

According to another aspect of the present invention, the syntactic analysis apparatus further includes means for receiving the correction command from the second means and for automatically deriving a corrected input sentence based on the correction command for an output to the first means, the first means performing the syntactic analysis of the corrected input sentence so as to generate a syntactic tree of the corrected input sentence.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 3 shows an example of an error analyzing rule for identifying or specifying a syntactic error included in an input sentence;

FIG. 4(A) shows an example of a sentence inputted to a syntax analyzing section of the syntactic analysis apparatus of FIG. 1;

FIG. 4(B) shows an example of syntactic subtrees of the input sentence produced by the syntax analyzing section;

FIG. 5(A) shows an example of a corrected input sentence produced by an input sentence correcting section of the syntactic analysis apparatus of FIG. 1;

FIG. 5(B) shows an example of a syntactic tree of the corrected input sentence produced by the syntax analyzing section.

DESCRIPTION OF THE PREFERRED EMBODIMENT

Now, a preferred embodiment of the present invention will be described hereinbelow with reference to the accompanying drawings.

Figure 1:
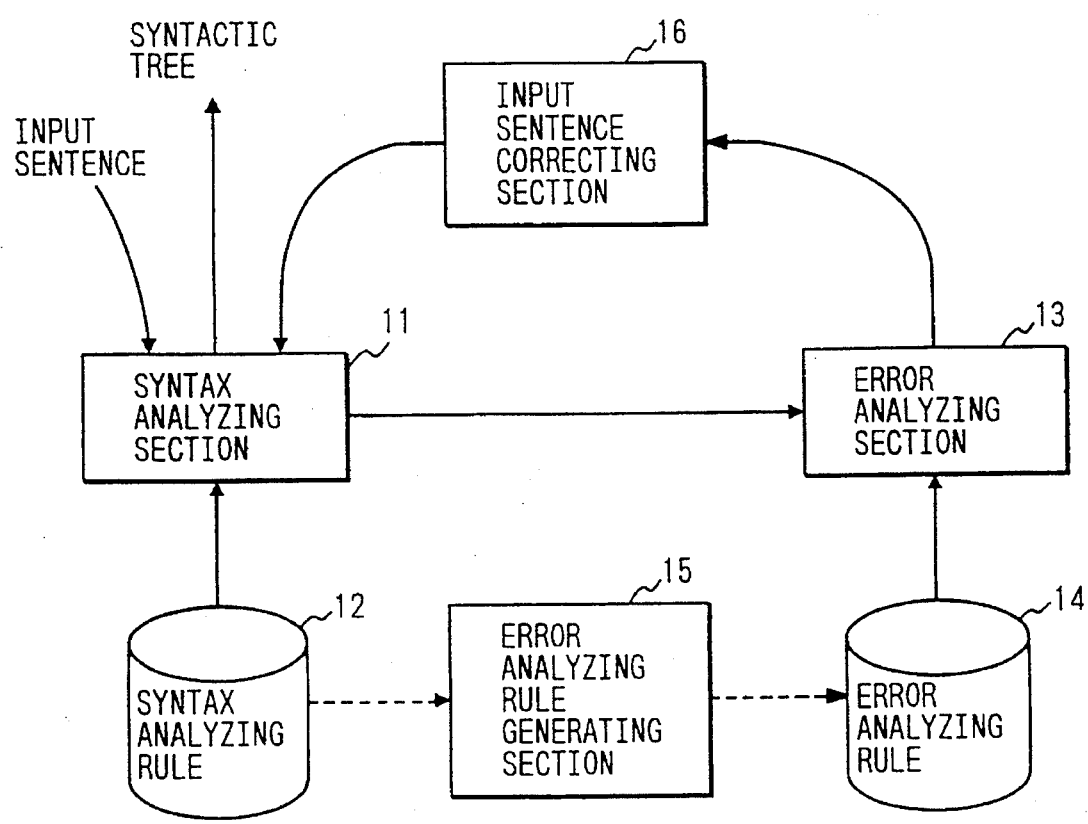
FIG. 1 is a block diagram showing the schematic structure of a syntactic analysis apparatus according to a preferred embodiment of the present invention.

FIG. 1 is a block diagram showing the schematic structure of a syntactic analysis apparatus according to the preferred embodiment of the present invention.

In FIG. 1, numeral 11 denotes a syntax analyzing section which receives an input sentence and performs a syntactic analysis thereof. The syntax analyzing section 11 outputs a syntactic tree of the input sentence when the syntactic analysis of the input sentence is successful. On the other hand, the syntax analyzing section 11 outputs syntactic subtrees of the input sentence when the syntactic analysis of the input sentence ends in failure. Numeral 12 denotes a syntax analyzing rule which is used in the syntax analyzing section 11 for the syntactic analysis of the input sentence. The syntax analyzing rule 12 includes therein a plurality of given rules. Numeral 13 denotes an error analyzing section which receives the syntactic subtrees of the input sentence when the syntax analyzing section 11 fails in the syntactic analysis of the input sentence. The error analyzing section 13 identifies or specifies a position or location and a kind or type of a syntactic error involved in the input sentence by applying an error analyzing rule 14 to the received syntactic subtrees. The error analyzing rule 14 includes therein a plurality of given rules. Numeral 15 denotes an error analyzing rule generating section which creates the error analyzing rule 14 based on the syntax analyzing rule 12, and numeral 16 denotes an input sentence correcting section which corrects the input sentence based on an analysis result of the error analyzing section 13 and inputs the corrected input sentence to the syntax analyzing section 11.

Figure 2:
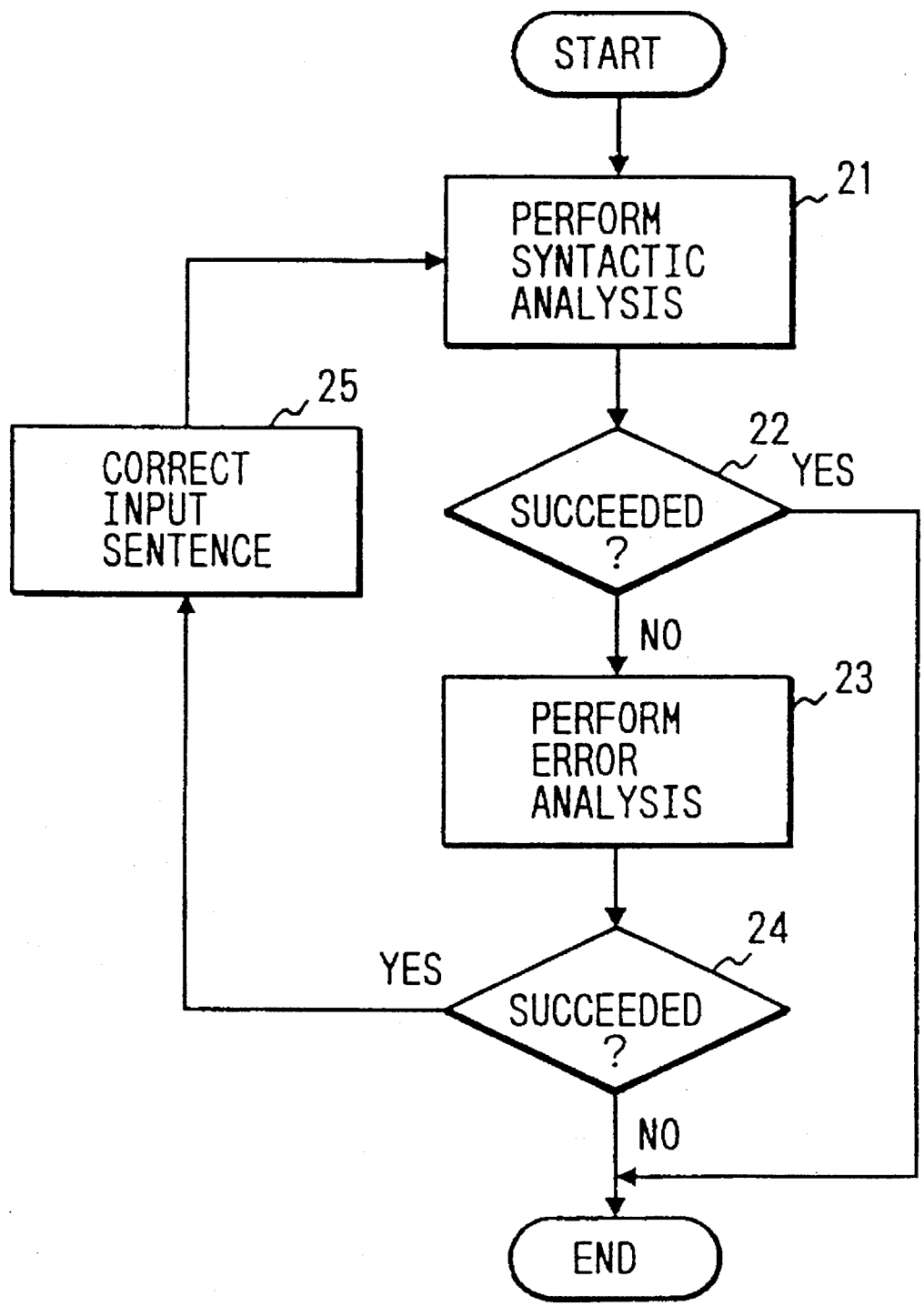
FIG. 2 is a schematic flowchart of a control routine for controlling the operation of the syntactic analysis apparatus of FIG. 1.

Now, the operation of the syntactic analysis apparatus as structured above will be described hereinbelow with reference to FIG. 2. FIG. 2 is a schematic flowchart of a control routine for controlling the operation of the syntactic analysis apparatus of FIG. 1.

At a step 21, the syntax analyzing section 11 performs the syntactic analysis of the input sentence using the syntax analyzing rule 12. Subsequently, at a step 22, the syntax analyzing section 11 outputs a syntactic tree corresponding to the input sentence when the syntactic analysis of the input sentence is succeeded, and the routine is terminated. On the other hand, when the syntactic analysis ends in failure, the syntax analyzing section 11 outputs to the error analyzing section 13 syntactic subtrees of the input sentence which have been generated up to the failure of the syntactic analysis by the syntax analyzing section 11, that is, up to a time point when the syntax analyzing section 11 finally fails in the syntactic analysis of the input sentence. Thereafter, at a step 23, the error analyzing section 13 specifies a location and a kind of a syntactic error by using the error analyzing rule 14 based on order and combination of the received syntactic subtrees and a syntactic attribute assigned to each of the received syntactic subtrees. Subsequently, at a step 24, when an applicable error analyzing rule can not be found or located in the error analyzing rule 14, the error analyzing section 13 outputs the syntactic subtrees of the input sentence created by the syntax analyzing section 11, and the routine is terminated. On the other hand, when the syntactic error is identified, the error analyzing section 13 outputs to the input sentence correcting section 16 a kind of the error and a location of the error in the input sentence, Thereafter, at a step 25, the input sentence correcting section 16 corrects the input sentence based on an analysis result produced by the error analyzing section 13 and sends the corrected input sentence to the syntax analyzing section 11. Accordingly, the routine returns to the step 21 where the syntax analyzing section 11 again performs the syntactic analysis relative to the corrected input sentence, Subsequently, at the step 22, when the syntactic analysis is succeeded, the syntax analyzing section 11 outputs a syntactic tree of the corrected input sentence, and the routine is terminated, On the other hand, when the syntactic analysis ends in failure, the syntax analyzing section 11 outputs syntactic subtrees of the corrected input sentence to the error analyzing section 13, and the foregoing processes are repeated, FIG. 3 shows an example of an error analyzing rule included in the error analyzing rule 14 for identifying or specifying the syntactic error included in the input sentence, In FIG. 3, the shown rule represents that:

"When an order of the syntactic subtrees is <NP> <VP> <.>; and when Condition-1, Condition-2, Condition-3, - - - is satisfied; then execute ApplyFunc-1, ApplyFunc-2, ApplyFunc-3, - - - "

In the above rule, Condition-* represents a function for checking an attribute relationship of the syntactic subtrees. Specifically, for example, Condition-1 has the following contents: "Condition-1: attribute "NUMBER" of <NP> and attribute "NUMBER" of <VP> differ from each other"

Further, in the above rule, ApplyFunc-* represents a function of a correction command to be sent to the input sentence correcting section 16 when a corresponding condition (Condition-*) this rule is satisfied. Specifically, for example, ApplyFunc-1 has the following contents:

"ApplyFunc-1: inflect a main element <V> of <VP> so as to invert attribute "NUMBER" of <V>"

In the role of FIG. 3, functions in the attribute conditioning section and functions in the executing section are set to correspond to each other such that Condition-1 corresponds to ApplyFunc-1, Condition-2 corresponds to ApplyFunc-2, and the like.

Now, the operation of the error analyzing section 13 will be described with reference to FIGS. 4(A) and 4(B). FIG. 4(A) represents an input sentence, wherein a subject at the beginning of the sentence is "He", while a corresponding verb is "drink". Accordingly, there is a discrepancy between attribute "NUMBER" of the subject and attribute "NUMBER" of the verb.

When this input sentence is analyzed by the syntax analyzing section 11, the syntax analyzing section 11 fails in the syntactic analysis of the input sentence due to the syntactic error included in the input sentence and outputs syntactic subtrees of the input sentence as shown in FIG. 4(B). Although some syntactic subtrees other than those shown in FIG. 4(B) are generated, FIG. 4(B) shows only those syntactic subtrees to which the error analyzing rule of FIG. 3 is finally applied. From the syntactic subtrees shown in FIG. 4(B), it can be interpreted as follows:

One word "He" forms the grammatical category <NP>, "drink water" forms the grammatical category <VP>, and the sentence is completed. Accordingly, the syntax analyzing section 11 has tried to apply a syntax analyzing rule "<S>→<NP><VP>" in the syntax analyzing rule 12 to the input sentence. However, such a syntax analyzing rule can not be applied to the input sentence due to an attribute relationship between <NP> and <VP> so that the syntax analyzing section 11 has failed in the syntactic analysis of the input sentence.

When the syntactic subtrees shown in FIG. 4(B) are inputted to the error analyzing section 13, the error analyzing section 13 tries to apply an error analyzing rule in the error analyzing rule 14 using the grammatical categories as keys, which represent kinds of the syntactic subtrees. To the syntactic subtrees of FIG. 4(B), the error analyzing rule of FIG. 3 is finally applied. Specifically, Condition-1 in the attribute conditioning section is applied so that the input sentence correcting section 16 corrects the input sentence according to the foregoing correction command of Apply-Func-1 as shown in FIG. 5(A) and the syntax analyzing section 11 outputs a syntactic tree of the corrected input sentence as shown in FIG. 5(B).

It is to be appreciated that a processing manner executed by the input sentence correcting section 16 will not be specified hereinbelow since various processing manners are obvious in the art once a correction command of Apply-Func-* is produced according to the preferred embodiment of the present invention.

Hereinbelow, examples of sentences including syntactic errors other than the foregoing syntactic error will be shown with corresponding corrected sentences.

(1) Uncountable Noun with Indefinite Article:
He drank a water. → He drank water.
(2) Plural Noun with Indefinite Article:
He has a teeth. → He has teeth.
(3) No Article before Noun:
He has dog. → He has a dog.
(4) Sound Discrepancy:
He slept a hour. → He slept an hour.
(5) Uncountable Noun with Modifier indicative of Plural:
He drank many water. → He drank a lot of water.
(6) Singular Noun with Modifier indicative of Plural:
Many boy had a book. → Many boys had a book.
(7) Case Error in Pronoun:
Him is running. → He is running.
(8) Verb following Auxiliary Verb other than "have" and "be" being not Bare Infinitive:
He can ran. → He can run.
(9) Verb following Auxiliary Verb "have" being not Past Participle:
He has go to Europe. → He has gone to Europe.
(10) Verb following Auxiliary Verb "be" being not Participle:
The birds are sing. → The birds are singing.
(11) Object of Preposition being inappropriate:
I gave it to he. → I gave it to him.
(12) Word of "-er, -est" Type with "more, most":
It is more nice. → It is nice.

Figure 6:
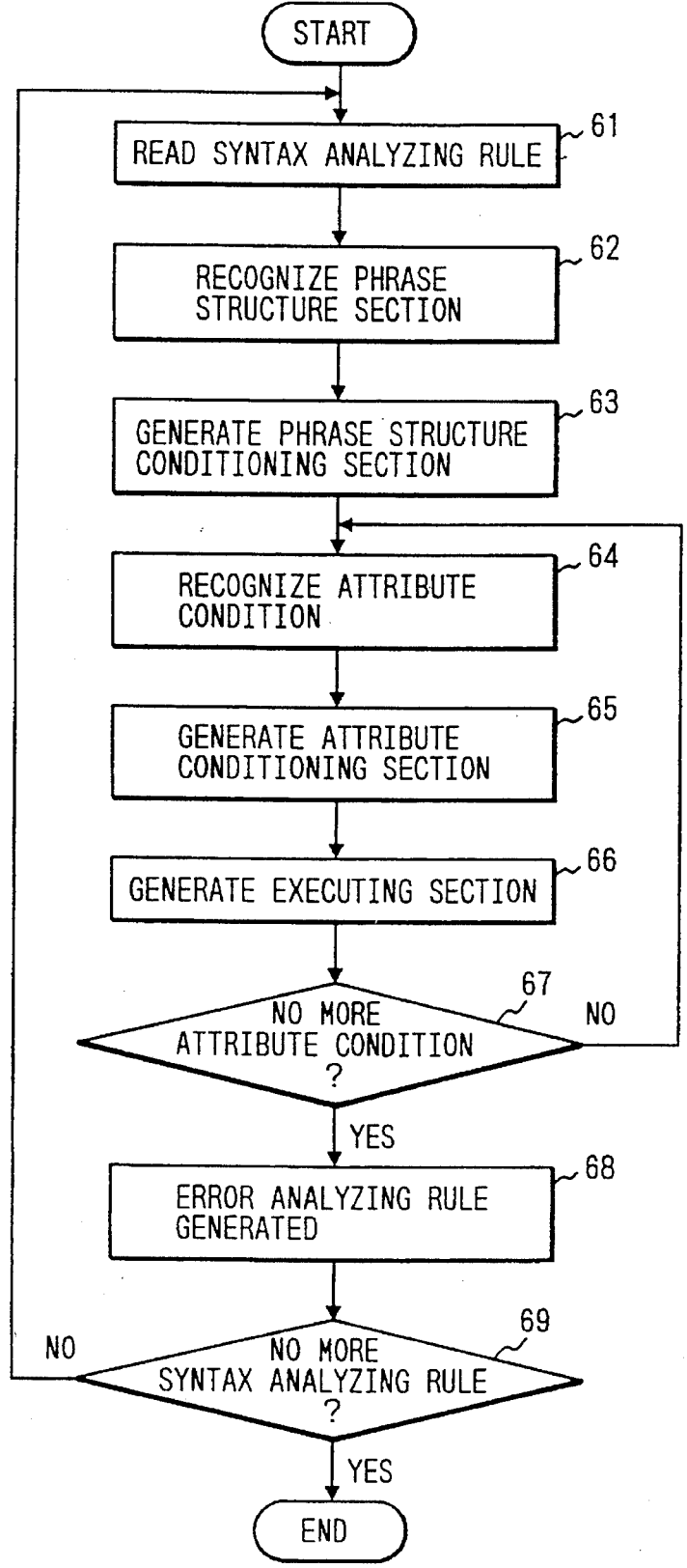
FIG. 6 is a schematic flowchart of a control routine for controlling the operation of an error analyzing rule generating section of the syntactic analysis apparatus of FIG. 1.

Now, the operation of the error analyzing rule generating section 15 will be described with reference to FIG. 6. FIG. 6 is a schematic flowchart of a control routine for controlling the operation of the error analyzing rule generating section 15.

At a step 61, the error analyzing rule generating section 15 reads out a first syntax analyzing rule in the syntax analyzing rule 12. Subsequently, at a step 62, the error analyzing rule generating section 15 recognizes a phrase structure section of the syntax analyzing rule read out at the step 61. Thereafter, at a step 63, the error analyzing rule generating section 15 generates a condition in the phrase structure conditioning section (see FIG. 3) of the error analyzing rule based on a right side of the phrase structure section of the syntax analyzing rule recognized at the step 62. At the step 63, when a grammatical category of a left side of the phrase structure section of the syntax analyzing rule is <S>, <.> is added at the ending of the condition in the phrase structure conditioning section of the error analyzing rule. Accordingly, when, for example, the phrase structure section of the syntax analyzing rule is <S>→<NP><VP>, "<NP><VP><.>" is generated as the condition in the phrase structure conditioning section of the error analyzing rule.

Subsequently, at a step 64, the error analyzing rule generating section 15 recognizes a first attribute condition among the attribute conditions in the syntax analyzing rule read out at the step 61. Thereafter, at a step 65, the error analyzing rule generating section 15 generates an attribute condition in the attribute conditioning section of the error analyzing rule based on the attribute condition of the syntax analyzing rule recognized at the step 64. Specifically, the attribute condition of the error analyzing rule is generated by logically inverting the attribute condition of the syntax analyzing rule. For example, when the attribute condition of the syntax analyzing rule is "attributes "NUMBER" and "PERSON" of <NP> and those of <VP> coincide with each other", then the attribute condition of the error analyzing rule becomes "attributes "NUMBER" and "PERSON" of <NP> and those of <VP> differ from each other". Similarly, "exist" becomes —not exist—, and "be" becomes —be not—.

Subsequently, at a step 66, the error analyzing rule generating section 15 generates a correction command in the executing section of the error analyzing rule based on the attribute condition of the error analyzing rule generated at the step 65. Specifically, the correction command is created by matching attributes of the latter in the phrase structure with attributes of the former in the phrase structure. Accordingly, in case of the attribute condition generated at the step 65, the correction command becomes "match attributes "NUMBER" and "PERSON" of <VP> with those of <NP>".

When the syntax analyzing rule read out at the step 61 includes a further attribute condition as checked at a step 67, the steps 64 to 66 are repeated so as to generate corresponding attribute condition and correction command in sequence. On the other hand, when the syntax analyzing rule read out at the step 61 includes no more attribute condition, the generation process of the corresponding error analyzing rule is finished at a step 68. Subsequently, when the syntax analyzing rule 12 includes a further syntax analyzing rule as checked at a step 69, the steps 61 to 68 are repeated so as to generate a corresponding error analyzing rule one by one. On the other hand, when the syntax analyzing rule 12 includes no more syntax analyzing rule, the routine is terminated. In the manner as described above, the error analyzing rule generating section 15 generates the vales of the error analyzing rule 14 corresponding to all the rules of the syntax analyzing rule 12.

Further description will be given hereinbelow with reference to FIG. 3.

The attribute condition of the syntax analyzing rule may include subconditions combined by "AND" and "OR". In this case, the subconditions combined by "AND" are regarded as one unit and converted to one Condition-*, and corresponding ApplyFunc-* is generated, for example, as shown below:

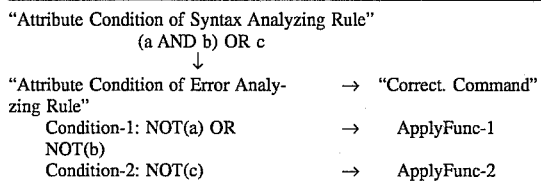

Further, when the error analyzing rule includes a plurality of pairs of "Condition-ApplyFunc", Condition-1, Condition-2, - - - are combined by "AND" to be evaluated, and ApplyFunc-1, ApplyFunc-2, - - - are executed in sequence until an AND condition becomes unsatisfied, as shown below:

if (C1 & C2 & . . . ) then (AF1 | AF2| . . . )

where C represents Condition and AF represents Apply-Func.

As appreciated from the foregoing description, in the syntactic analysis apparatus according to the preferred embodiment of the present invention, when the syntax analyzing section 11 fails in the syntactic analysis of the input sentence due to the syntactic error included In the input sentence and thus is unable to produce the syntactic tree of the input sentence, the error analyzing section 13 receives the syntactic subtrees of the input sentence obtained by the syntax analyzing section 11 up to such failure and applies the error analyzing rule to the received syntactic subtrees so as to identify or specify the included syntactic error.

Further, a corrected input sentence is automatically derived based on the identified syntactic error by means of the input sentence correcting section 16.

Further, the error analyzing rule 14 is automatically generated using the syntax analyzing rule 12 by means of the error analyzing rule generating section 15.

It is to be understood that this invention is not to be limited to the particular structures as described above, and that various changes and modifications may be made without departing from the spirit and scope of the invention as defined in the appended claims.

What is claimed is:

1. A syntactic analysis apparatus for performing a syntactic analysis of an input sentence according to a given syntax analyzing rule for generating a syntactic tree of the input sentence, said syntactic analysis apparatus comprising:

syntax analyzing means for outputting syntactic subtrees of said input sentence created by said syntax analyzing means up to a time point when said syntax analyzing means fails in said syntactic analysis of said input sentence due to a syntactic error included in said input sentence;

error analyzing means for receiving said syntactic subtrees from said syntax analyzing means and for identifying said syntactic error by applying a given error analyzing rule to said received syntactic subtrees, error analyzing rule generating means for generating said error analyzing rule by logically inverting said syntax analyzing rule, said error analyzing rule defining a condition of said syntactic subtrees which represents said syntactic error, wherein said error analyzing rule further defines a correction command for correcting said syntactic error represented by said condition; and input sentence correcting means responsive to said correction command for correcting said input sentence in accordance with said correction command;

whereby the apparatus identifies and corrects said syntactic error when said condition of the applied error analyzing rule matches said syntactic error.

2. The syntactic analysis apparatus as set forth in claim 1, wherein said input sentence correcting means corrects said input sentence based on said identified syntactic error.

3. The syntactic analysis apparatus as set forth in claim 1, wherein said error analyzing rule generating means generates individual attribute conditions of said error analyzing rule by logically inverting corresponding individual attribute conditions of said syntax analyzing rule.

4. The syntactic analysis apparatus as set forth in claim 1, wherein said error analyzing rule defines a plurality of conditions each corresponding to and representing a portion of said syntactic error and wherein said error analyzing rule further defines correction commands each for correcting said portion of the syntactic error represented by said corresponding condition.

5. The syntactic analysis apparatus as set forth in claim 1, wherein said error analyzing means outputs an identification of said syntactic error.

6. The syntactic analysis apparatus as set forth in claim 5, wherein said input sentence correcting means is further responsive to said identification of said syntactic error from said error analyzing means for correcting said input sentence in accordance with said identification.

7. The syntactic analysis apparatus as set forth in claim 5, wherein said error analyzing means further operates for identifying a location of said syntactic error in the input sentence and outputs said location of said syntactic error.

8. The syntactic analysis apparatus as set forth in claim 7, wherein said input sentence correcting means is further responsive to said identification and said location of said syntactic error from said error analyzing means for correcting said input sentence in accordance with said identification and said location.

9. A syntactic analysis apparatus comprising:

first means for storing a plurality of given syntax analyzing rules;

second means for receiving an input sentence and for performing a syntactic analysis of said input sentence by applying said stored syntax analyzing rules in sequence, said second means outputting a syntactic tree of said input sentence when said syntactic analysis is successful and outputting syntactic subtrees of said input sentence when said syntactic analysis ends in failure due to syntactic error included in said input sentence;

third means for storing a plurality of given error analyzing rules;

error analyzing rule generating means for generating said error analyzing rules by logically inverting said syntax analyzing rules, and fourth means for receiving said syntactic subtrees of said input sentence and for identifying said syntactic error by applying said stored error analyzing rules in sequence to said received syntactic subtrees, each of said error analyzing rules defining a first condition on relationship between syntactic subtrees, said first condition corresponding to and representing an expected syntactic error included in an output sentence, wherein each of said error analyzing rules further defines a correction command for correcting said expected syntactic error represented by said first condition; and input sentence correcting means responsive to said correction command for correcting said input sentence in accordance with said correction command;

whereby the apparatus identifies and corrects said syntactic error when said first condition of the applied error analyzing rule matches said syntactic error.

10. The syntactic analysis apparatus as set forth in claim 9, wherein said error analyzing rules include a second condition defining an attribute relationship between given grammatical categories, said second condition being logically inverted relative to a corresponding third condition in said syntax analyzing rules, said fourth means identifying said syntactic error in accordance with said third condition when said second condition matches said syntactic subtrees received thereby.

11. The syntactic analysis apparatus as set forth in claim 10, further comprising means for automatically producing said error analyzing rules from said syntax analyzing rules by logically inverting said third condition in said syntax analyzing rules.

12. The syntactic analysis apparatus as set forth in claim 10, wherein said error analyzing rules further include a correction command corresponding to said second condition, said correction command defining a location and a kind of said syntactic error.

13. The syntactic analysis apparatus as set forth in claim 12, further comprising means for receiving said correction command from said fourth means and for automatically deriving a corrected input sentence based on said correction command for an output to said second means, and wherein said second means performs the syntactic analysis of said corrected input sentence and generating a syntactic tree of said corrected input sentence.

14. The syntactic analysis apparatus as set forth in claim 9, wherein each of said error analyzing rules defines a plurality of first conditions each representing a portion of said expected syntactic error and wherein each of said error analyzing rules further defines correction commands each for correcting said portion of the expected syntactic error represented by said corresponding first condition.

* * * * *

UNITED STATES PATENT AND TRADEMARK OFFICE
CERTIFICATE OF CORRECTION

PATENT NO. : 5,487,000
DATED : January 23, 1996
INVENTOR(S) : Masanori TAKAHASHI et al.

It is certified that error appears in the above-indentified patent and that said Letters Patent is hereby corrected as shown below:

On the title page, item [73] should read as follows:

--[73] Assignee: Matsushita Electric Industrial Co., Ltd., Osaka, Japan--

Signed and Sealed this

Second Day of July, 1996

Attest:

BRUCE LEHMAN

Attesting Officer

Commissioner of Patents and Trademarks